(12) United States Patent
Akkarakaran et al.

(10) Patent No.: US 11,283,573 B2
(45) Date of Patent: Mar. 22, 2022

(54) REFERENCE SIGNAL DESIGN SUPPORTING ULTRA-RELIABLE LOW-LATENCY COMMUNICATION (URLLC) INTERRUPTION

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/107,825

(22) Filed: Aug. 21, 2018

(65) Prior Publication Data
US 2019/0068346 A1    Feb. 28, 2019

Related U.S. Application Data

(60) Provisional application No. 62/548,932, filed on Aug. 22, 2017.

(51) Int. Cl.
*H04L 5/00* (2006.01)
*H04W 72/04* (2009.01)

(52) U.S. Cl.
CPC .......... *H04L 5/0051* (2013.01); *H04L 5/0042* (2013.01); *H04L 5/0044* (2013.01);
(Continued)

(58) Field of Classification Search
CPC ... H04L 5/0042; H04L 5/0044; H04L 5/0048; H04L 5/0051; H04L 5/0064; H04L 5/0078; H04W 72/042; H04W 72/0446
See application file for complete search history.

(56) References Cited

U.S. PATENT DOCUMENTS

| 9,544,115 B2 | 1/2017 | Barbieri et al. |
| 2017/0230869 A1 | 8/2017 | Kubota et al. |

(Continued)

FOREIGN PATENT DOCUMENTS

| WO | WO-0020876 A1 | 4/2000 |
| WO | WO-2015026604 A1 | 2/2015 |
| WO | WO-2018032001 A1 | 2/2018 |

OTHER PUBLICATIONS

International Search Report and Written Opinion—PCT/US2018/047541—ISA/EPO—dated Nov. 29, 2018.

(Continued)

*Primary Examiner* — Jung H Park
*Assistant Examiner* — M Mostazir Rahman
(74) *Attorney, Agent, or Firm* — Haynes and Boone, LLP

(57) ABSTRACT

Wireless communications systems and methods related to configuring reference signals to support an interruption of a high-priority transmission to a low-priority transmission are provided. A base station (BS) transmits, to a user equipment (UE), a configuration for determining whether to communicate a first reference signal after a communication of first data is interrupted by a communication of second data having a higher priority than the first data. The BS communicates, with the UE, the first data in a transmission time interval (TTI). The BS communicates, with the UE, the second data in the TTI before the communicating the first data has completed. The BS communicates, with the UE based on the configuration, a first reference signal in the TTI after communicating the second data.

30 Claims, 7 Drawing Sheets

(52) U.S. Cl.
CPC .......... *H04L 5/0048* (2013.01); *H04L 5/0064* (2013.01); *H04L 5/0078* (2013.01); *H04W 72/042* (2013.01); *H04W 72/0446* (2013.01)

(56) References Cited

U.S. PATENT DOCUMENTS

| | | | |
|---|---|---|---|
| 2017/0359807 A1* | 12/2017 | Hong | H04W 52/325 |
| 2018/0041858 A1 | 2/2018 | Sheng et al. | |
| 2018/0063865 A1 | 3/2018 | Islam et al. | |
| 2018/0092104 A1 | 3/2018 | Sheng et al. | |
| 2019/0173554 A1* | 6/2019 | Kwak | H04B 7/0417 |
| 2019/0215133 A1* | 7/2019 | Pan | H04W 72/0446 |
| 2019/0254058 A1* | 8/2019 | Xie | H04L 5/0064 |
| 2019/0260546 A1* | 8/2019 | Kilinc | H04W 72/0446 |
| 2020/0037292 A1* | 1/2020 | Oh | H04W 72/04 |

OTHER PUBLICATIONS

Nokia et al., "Punctured Scheduling for Low Latency Transmissions", 3GPP Draft; R1-1609747_Punctured Scheduling_Final, 3rd Generation Partnership Project (3GPP), Mobile Competence Centre, 650, Route Des Lucioles, F-06921, Sophia-Antipolis Cedex, France, vol. RAN WG1, No. Lisbon, Portugal; Oct. 10, 2016-Oct. 14, 2016 Oct. 9, 2016, XP051149780, Retrieved from the Internet: URL:http://www.3gpp.org/ftp/Meetings_3GPP_SYNC/RAN1/Docs/ [retrieved on Oct. 9, 2016], 5 pages.
Ji H., et al., "Ultra Reliable and Low Latency Communications in 5G Downlink: Physical Layer Aspects", 2017, 17 pages.
Guanzhi Y., et al., "Overview and Performance Test of NB-IoT", Computer Engineering, Issue #1, vol. 46, Jan. 15, 2020, (Oct. 22, 2016), pp. 1-46.

\* cited by examiner

REFERENCE SIGNAL DESIGN SUPPORTING ULTRA-RELIABLE LOW-LATENCY COMMUNICATION (URLLC) INTERRUPTION

CROSS REFERENCE TO RELATED APPLICATIONS

The present application claims priority to and the benefit of the U.S. Provisional Patent Application No. 62/548,932, filed Aug. 22, 2017, which is hereby incorporated by reference in its entirety as if fully set forth below and for all applicable purposes.

TECHNICAL FIELD

This application relates to wireless communication systems and methods, and more particularly to configuring reference signals in a low-priority transmission to support an interruption from a high-priority transmission.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE). The communication direction from a BS to a UE is referred to as DL. The communication direction from a UE to a BS is referred to as UL.

To meet the growing demands for expanded mobile broadband connectivity, wireless communication technologies are advancing from the LTE technology to a next generation new radio (NR) technology. One technique for expanding connectivity may be to extend the frequency operation range to higher frequencies since lower frequencies are becoming over-crowded. For example, some NR systems may operate in a millimeter wave (mmWav) frequency bands. In addition, NR may support ultra-reliable low-latency (URLLC) applications, which may have stringent timing constraints (e.g., about 1 millisecond (ms) end-to-end) and error constraints (e.g., a block error ratio (BLER) of about 0.001%).

To meet the constraints of URLLC, NR may allow an URLLC transmission to interrupt an ongoing lower priority transmission, for example, an enhanced mobile broadband (eMBB) transmission. The URLLC transmission may be transmitted using a different transmission configuration (e.g., a different numerology, a different bandwidth, or a different component carrier) than the eMBB traffic. A receiver may be required to switch from receiving the eMBB transmission to the URLLC transmission, and back to the eMBB transmission. The switching can cause challenges in the decoding of the eMBB transmission at the receiver.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating a configuration for determining whether to communicate a first reference signal after a communication of first data is interrupted by a communication of second data having a higher priority than the first data; communicating the first data in a transmission time interval (TTI); communicating the second data in the TTI before the communicating the first data has completed; and communicating, based on the configuration, the first reference signal in the TTI after communicating the second data to facilitate communicating of remaining first data.

In an additional aspect of the disclosure, an apparatus includes a transceiver configured to communicate a configuration for determining whether to communicate a first reference signal after a communication of first data is interrupted by a communication of second data having a higher priority than the first data; communicate the first data in a transmission time interval (TTI); communicate the second data in the TTI before the communicating the first data has completed; and communicate, based on the configuration, a first reference signal in the TTI after communicating the second data to facilitate communicating of remaining first data.

In an additional aspect of the disclosure, a non-transitory computer-readable medium having program code for wireless communication recorded thereon, the program code comprising instructions executable by a processor to communicate a configuration for determining whether to communicate a first reference signal after a communication of first data is interrupted by a communication of second data having a higher priority than the first data; communicate the first data in a transmission time interval (TTI); communicate the second data in the TTI before the communicating the first data has completed; and communicate, based on the configuration, the first reference signal in the TTI after communicating the second data to facilitate communicating of remaining first data.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
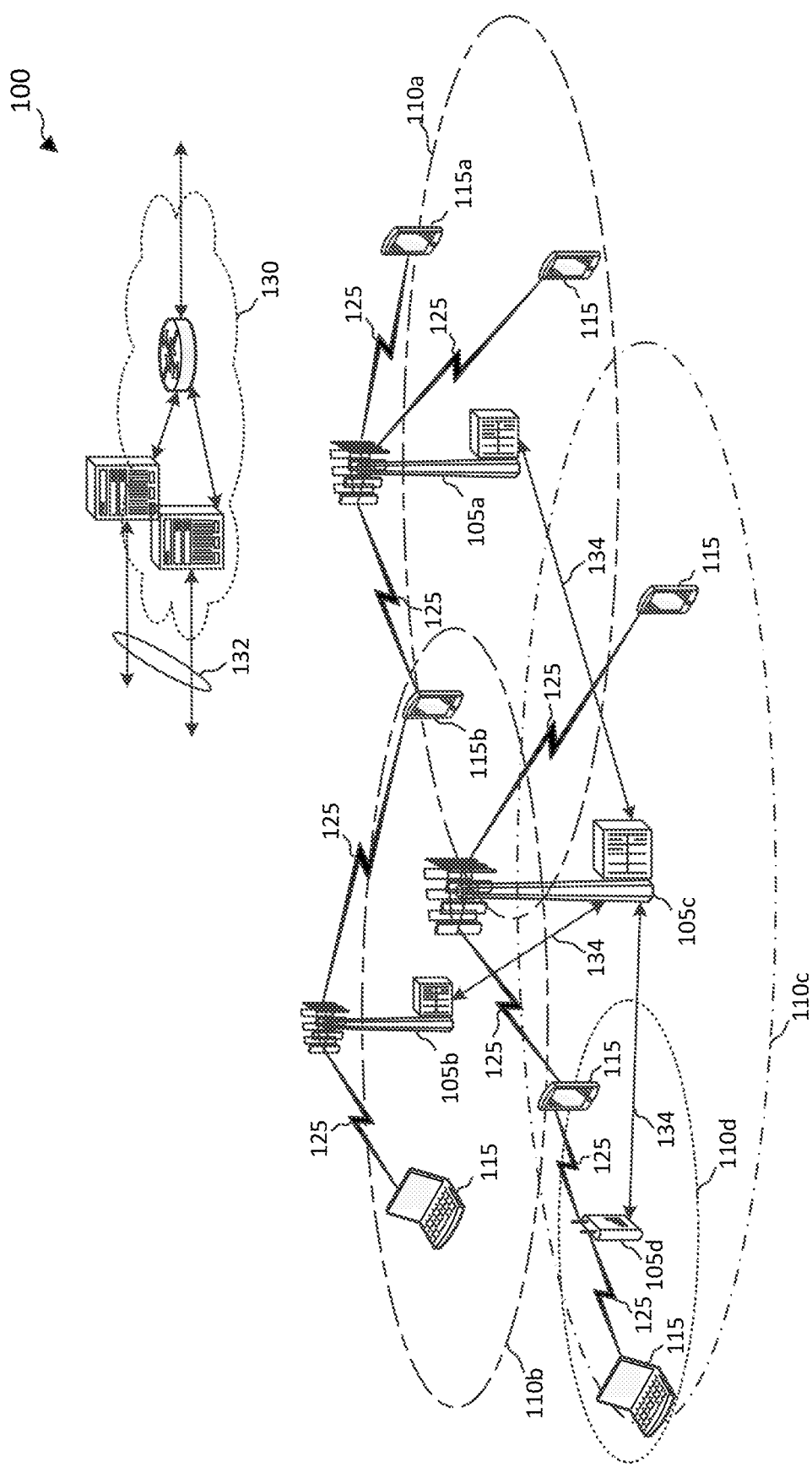
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWave bands) network.

To facilitate communications in a wireless network, a transmitter may transmit one or more reference signals to allow a receiver to determine an estimate of the channel between the transmitter and the receiver. The reference signals may include any predetermined sequences known to the transmitter and the receiver. Examples of reference signals may include demodulation reference (DMRS), channel state information-reference signal (CSI-RS), sounding reference signal (SRS), and phase tracking reference signal (PTRS). Different reference signals may include different sequences. A transmission may be scheduled in units of transmission time intervals (TTIs). A reference signal may have certain time-frequency pattern, density, or distribution within a TTI. For example, a DMRS may occupy certain frequencies over a portion of a TTI. Alternatively, a PTRS may occupy certain frequencies over an entire duration of a TTI.

A transmitter may transmit a reference signal at a beginning portion of a transmission time interval (TTI) so that a corresponding receiver may estimate the channel at the beginning of the TTI and decodes subsequent data based on the channel estimate without buffering a large amount of data. For example, the transmitter may transmit a reference signal, followed by eMBB data. The reference signal may facilitate decoding of the eMBB data at the receiver. To support URLLC applications, the transmitter may switch to serve URLLC traffic before completing an eMBB transmission. The URLLC traffic and the eMBB traffic may have different transmission characteristics. When the receiver switches from receiving the URLLC traffic to receiving the remaining eMBB traffic, the receiver may experience a loss of phase coherence in the channel estimate obtained from the reference signal of the eMBB transmission, and thus the reception performance of the remaining eMBB data (e.g., after the URLLC traffic) may be degraded. The loss of phase coherence may be caused by the transmitter switching or the receiver switching or both.

The present application describes mechanisms for configuring reference signals in a low-priority transmission to support an interruption from a high-priority transmission. For example, the low-priority transmission may correspond to an eMBB transmission and the high-priority transmission may correspond to an URLLC transmission. In the disclosed embodiments, a transmitter may transmit URLLC data before completing an on-going transmission of eMBB data. For example, the transmitter may transmit a portion of the eMBB data and switch to transmit the URLLC data and subsequently switch back to complete the transmission of remaining eMBB data. The transmitter may transmit one or more additional reference signals after the URLLC transmission. The insertion or the transmission of the additional reference signals may be dependent on various factors, such as an initial reference signal configuration for the eMBB transmission, the MCS, transmission rank, and/or waveform type of the eMBB transmission, the transmission power levels for the eMBB data and the URLLC data, and/or the capability of a transmitter or a corresponding receiver or both.

The additional reference signals can facilitate decoding of remaining eMBB data at the receiver after the reception of the URLLC data. For example, the receiver may re-estimate the channel between the transmitter and the receiver after the reception of the URLLC data. While the disclosed embodiments are described in the context of eMBB traffic and URLLC traffic, the disclosed embodiments may be applied to any traffic of different priorities.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may support traffic of different priorities. For example, the network 100 may support both eMBB communications and URLLC communications. The network 100 may allow an URLLC communication to interrupt an eMBB communication. For example, a BS 105 may schedule a DL eMBB communication with a UE 115. The BS 105 may transmit one or more reference signals to facilitate channel estimation and decoding of the DL eMBB communication at the UE 115. While the DL eMBB communication is in progress, the BS 105 may determine that an URLLC application has DL data to be transmitted. The BS 105 may interrupt the ongoing DL eMBB communication and schedule a DL URLLC communication with the UE 115. The DL eMBB communication and the DL URLLC communication may have different transmission characteristics (e.g., different numerologies, different bandwidths, and/or different component carriers). The BS 105 may configure the reference signals such that the UE 115 may obtain an accurate channel estimate for decoding the remaining DL eMBB communication after the DL URLLC communication. Similarly, a BS 105 may schedule a UL URLLC communication with a UE 115 while a prior-scheduled UL eMBB communication is in progress, in which case the UE 115 may configure reference signals such that the BS 105 may obtain an accurate channel estimate for decoding the remaining UL eMBB communication after the UL URLLC communication. Mechanisms for configuring reference signals to support an interruption from a higher priority traffic are described in greater detail herein.

Figure 2:
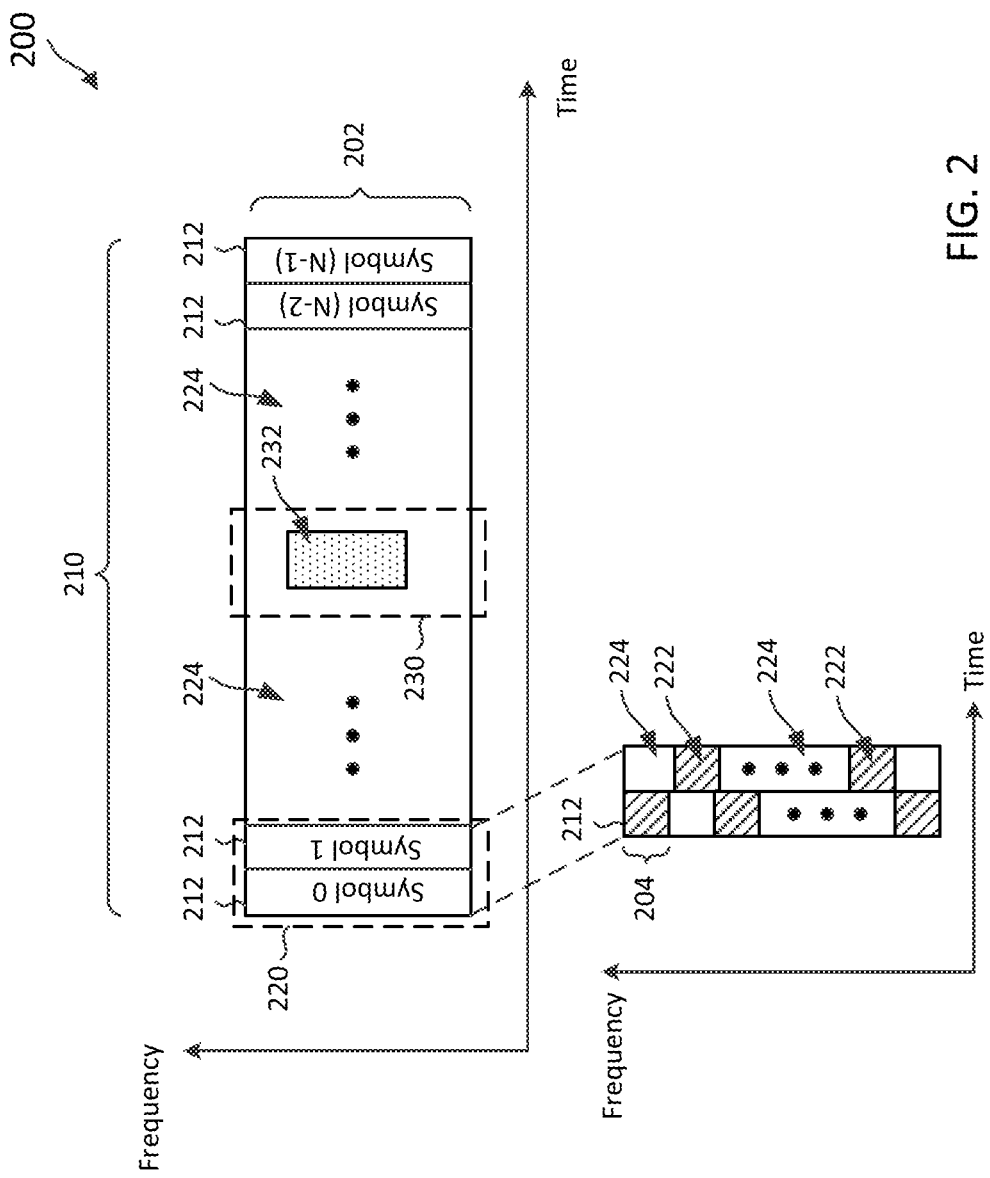
FIG. 2 illustrates a transmission scenario including an enhanced mobile broadband (eMBB) transmission and an ultra-reliable low latency communication (URLLC) transmission according to embodiments of the present disclosure.

FIG. 2 illustrates a transmission scenario 200 including an eMBB transmission and a URLLC transmission according to embodiments of the present disclosure. In FIG. 2, the x-axes represent time in some constant units and the y-axes represent frequency in some constant units. The scenario 200 may correspond to a communication scenario between a BS 105 and a UE 115 in the network 100. The scenario 200 includes a transmission time interval (TTI) 210 in a frequency band 202. The frequency band 202 may be located in any suitable frequency spectrum, for example, including a sub-6 gigahertz (GHz) spectrum or mmWav spectrum. The TTI 210 includes a plurality of symbols 212. In some instances, the duration of the TTI 210 or the number of symbols 212 in the TTI 210 may be variable. As shown, the TTI 210 includes N number of symbols 212 (e.g., indexed 0 to N−1), where N may be any positive integer. The symbols 212 may correspond to OFDM symbols.

For example, a BS may communicate a DL eMBB transmission with a UE in the TTI 210. The BS may transmit a reference signal 222 (e.g., shown as patterned-filled boxes) at a beginning portion 220 of the TTI 210. As shown, the reference signal 222 is transmitted on a plurality of frequency tones 204 during the first two symbols 212 (e.g., indexed 0 and 1) of the TTI 210. However, the reference signal 222 may be transmitted during other symbols 212 within the TTI 210 and may include any suitable frequency and/or time densities. The BS may transmit eMBB data 224 in remaining frequency tones (e.g., shown as empty-filled boxes)

The UE may determine an estimate for the channel between the BS and the UE based on the reference signal 222. The UE may decode the eMBB data 224 based on the determined channel estimate.

The BS may schedule a DL URLLC transmission with the UE while the eMBB transmission is in progress, for example, during a portion 230 of the TTI 210. As shown, the BS may transmit URLLC data 232 during the portion 230, for example, using some resources within the portion 230. The BS may transmit eMBB data 224 during the portion 230 using other resources not occupied by the URLLC transmission and may continue to transmit remaining eMBB data 224 after transmitting the URLLC data 232.

While FIG. 2 illustrates the transmission of the URLLC data 232 in a portion of the frequency band 202, in some instances, the URLLC data 232 may be transmitted over the same bandwidth or a wider bandwidth than the eMBB data 224, or in a different component carrier (e.g., different frequency spectrum) than the eMBB data 224. In any case, the transmission of the URLLC data 232 and the transmission of the eMBB data 224 may have different transmission characteristics (e.g., different transmit power, frequency resource, component carrier or bandwidth-part). Thus, the UE may configure the receiver (e.g., the radio-frequency (RF) frontend and/or the clock or voltage-controlled oscillator (VCO)) differently for receiving the URLLC data 232 and eMBB data 224. As such, when the UE returns to receiving remaining eMBB data 224 after the portion 230, the UE may experience a loss of phase coherence (e.g., a random phase change) when using the same channel estimate determined prior to the reception of the URLLC data 232. While FIG. 2 is described in the context of a DL URLLC transmission interrupting a DL eMBB transmission, similar scenario can occur in the UL direction, where a UL URLLC transmission may interrupt a UL eMBB transmission.

Figure 3:
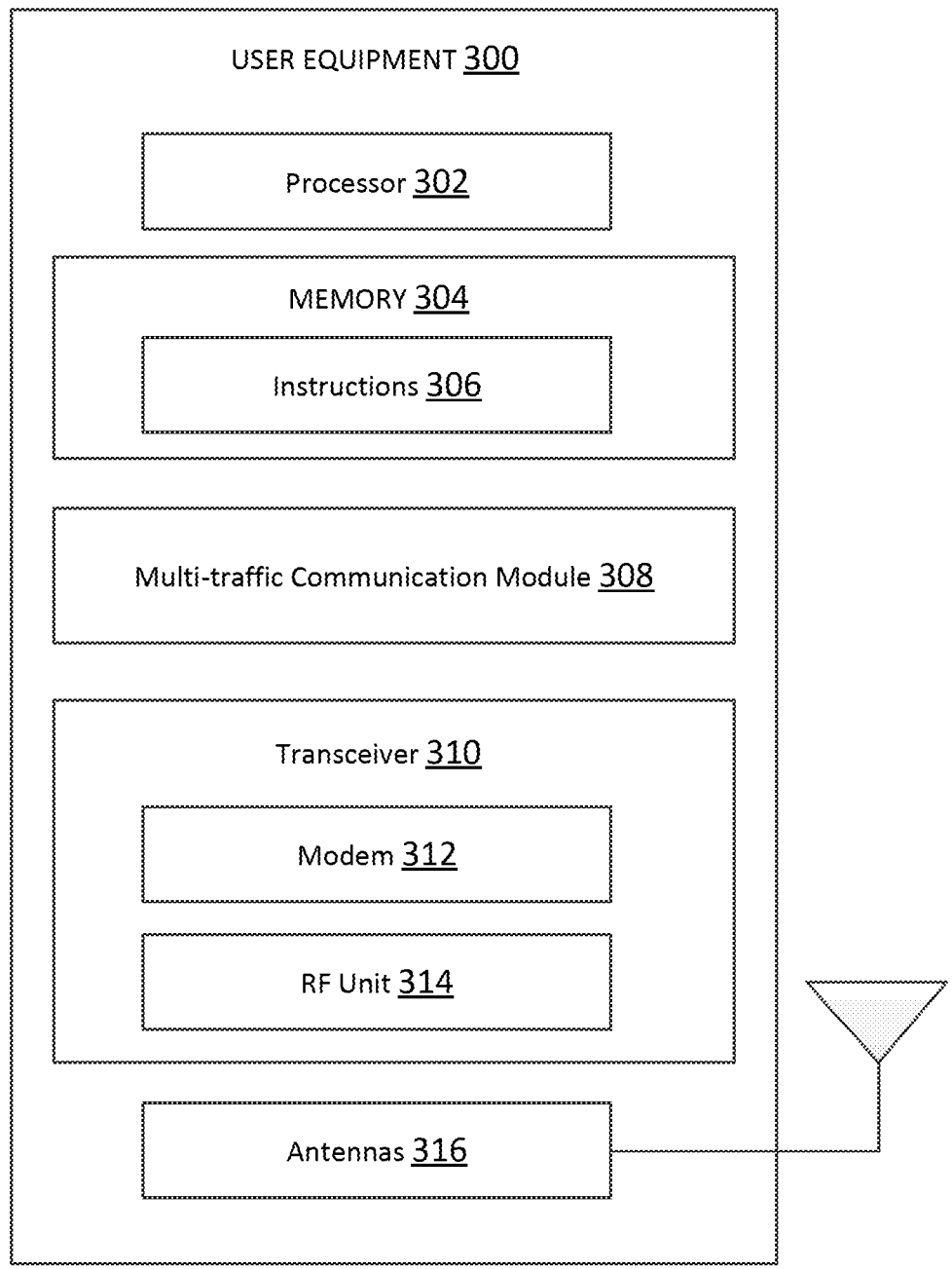
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, a multi-traffic communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The multi-traffic communication module 308 may be implemented via hardware, software, or combinations thereof. For example, the multi-traffic communication module 308 may be implemented as a processor, circuit, and/or instructions 306 stored in the memory 304 and executed by the processor 302. The multi-traffic communication module 308 may be used for various aspects of the present disclosure. For example, the multi-traffic communication module 308 is configured to synchronize to a BS (e.g., the BSs 105) in a network (e.g., the network 100), initiate network access, communicate different types of traffic (e.g., URLLC and eMBB traffic) with the BS, and/or transmit reference signals to support interruptions of high-priority traffic to low-priority, as described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or multi-traffic communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of reference signals to support interruptions of high-priority traffic (e.g., URLLC) to low-priority traffic (e.g., eMBB) of according to embodiments of the present disclosure. The antennas 316 may further receive data messages transmitted from other devices. This may include, for example, reception of discovery signals such as PSSs, SSSs, PBCH signals, URLLC traffic, and eMBB traffic according to embodiments of the present disclosure. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
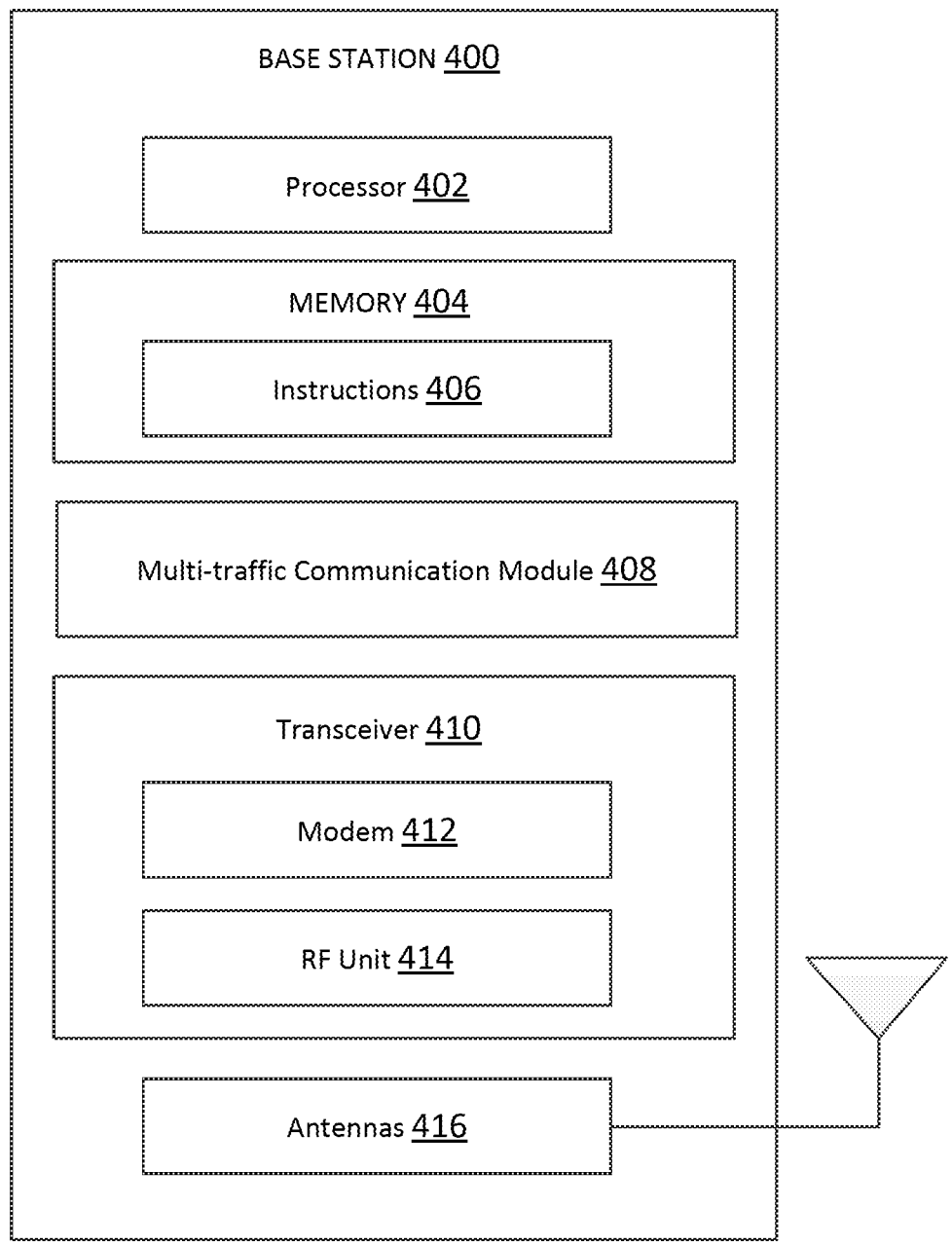
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above. A shown, the BS 400 may include a processor 402, a memory 404, a multi-traffic communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The multi-traffic communication module 408 may be implemented via hardware, software, or combinations thereof. For example, the multi-traffic communication module 408 may be implemented as a processor, circuit, and/or instructions 406 stored in the memory 404 and executed by the processor 402. The multi-traffic communication module 408 may be used for various aspects of the present disclosure. For example, the multi-traffic communication module 408 is configured to broadcast system information signals to UEs (e.g., the UEs 115) in a network (e.g., the network 100), schedule and communicate different types of traffic (e.g., URLLC and eMBB traffic) with the UEs, and/or transmit reference signals to support interruptions of high-priority traffic to low-priority, as described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming and/or digital beamforming for directional signal transmissions and/or receptions. In some embodiments, the transceiver 410 may include antenna array elements and/or transceiver components (e.g., power amplifiers) that can be switched on or off to form a beam in a particular direction. Alternatively, the transceiver 410 may include multiple transmit/receive chains and may switch between the multiple transmit/receive chains to form a beam in a particular direction. In some embodiments, the antenna array elements may be different or configured differently for UL and DL paths. Thus, UL and DL may have different antenna array gains. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
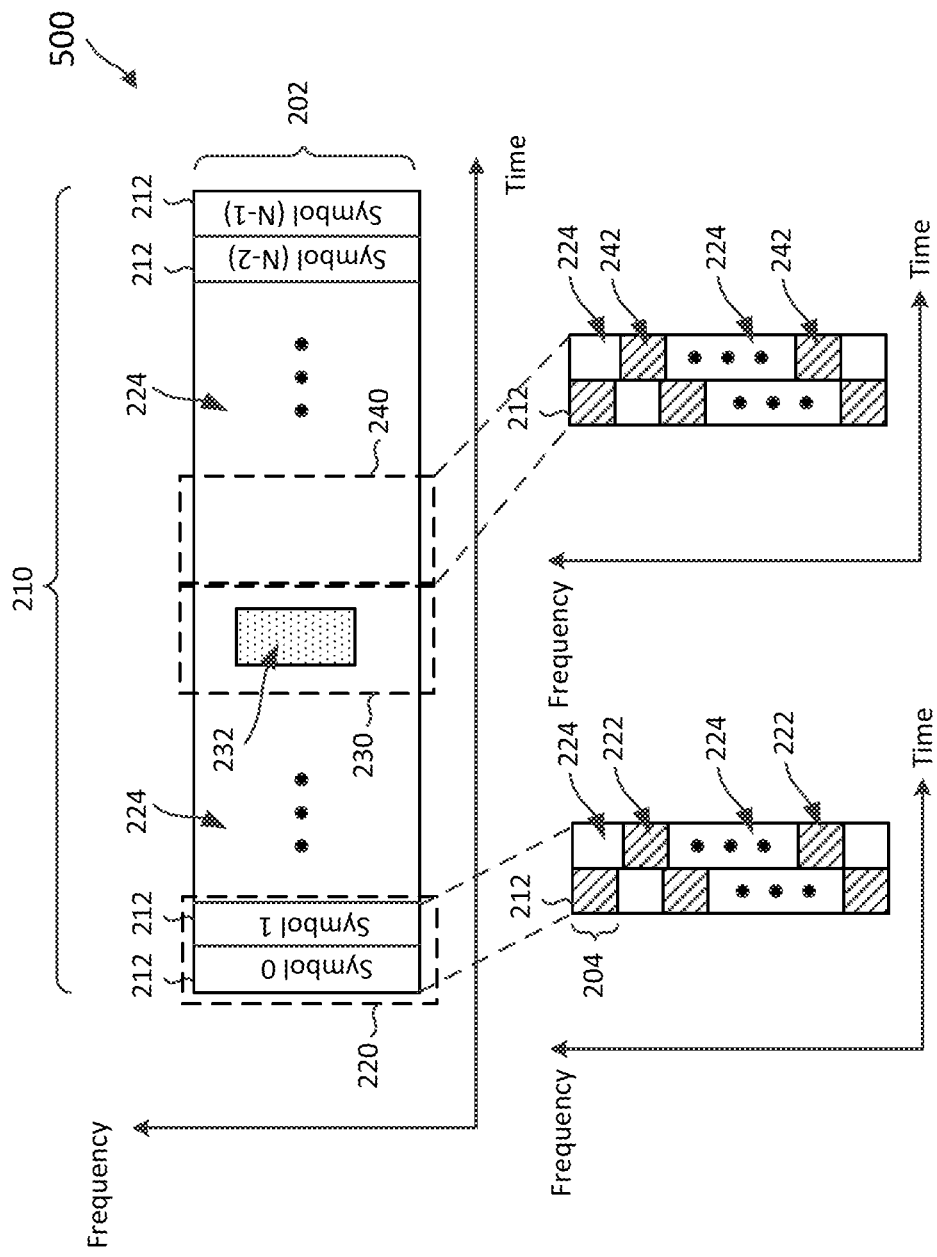
FIG. 5 illustrates a transmission configuration that implements a reference signal insertion after an URLLC transmission according to embodiments of the present disclosure.

FIG. 5 illustrates a transmission configuration 500 that implements a reference signal insertion after an URLLC transmission according to embodiments of the present disclosure. In FIG. 5, the x-axes represent time in some constant units and the y-axes represent frequency in some constant units. The configuration 500 may be employed by BSs such as the BSs 105 and 400 and UEs such as the UEs 115 and 300 in a network such as the network 100. The configuration 500 may include a time-frequency configuration substantially similar to the scenario 200. For example, the configuration 500 includes a TTI 210 in a frequency band 202. A BS may schedule DL URLLC data 232 before the completion of eMBB data 224 transmission and may transmit a reference signal 222 at the beginning portion 220 of the TTI 210. However, in the configuration 500, the BS transmits an additional reference signal 242 in a portion 240 following the portion 230. For example, the portion 230 may include symbols 212 indexed 5 and 6 and the portion 240 may include symbols 212 indexed 7 and 8. The reference signal 242 may include the same sequence as the reference signal 222 or a different sequence. The reference signal 242 may have the same frequency and/or time distribution as the reference signal 222 or a different frequency and/or time distribution. The insertion of the reference signal 242 allows the UE (e.g., the receiver) to re-estimate the channel after the reception of the URLLC data 232. For example, the UE may decode the remaining eMBB data 224 in the portion after the portion 240 using the channel estimate obtained based on the reference signal 242. As such, the loss of phase coherence due to the switching to receive the URLLC data 232 may not affect subsequent reception and decoding of the remaining eMBB data 224.

The additional reference signal 242 may be inserted using a puncturing technique or a rate-matching technique. To apply puncturing, a transmitter may assign modulation symbols to all frequency tones 204 and replacing the frequency tones with the reference signal 242 when the particular frequency tones are assigned for the transmission of the reference signal 242, for example, based on a certain time-frequency pattern or distribution. To apply rate-matching, a transmitter may assign modulation symbols to frequency tones that are not occupied by the reference signal 242. The applying of rate-matching may introduce some additional constraints. For example, the assigning or mapping of the modulation symbols to the frequency tones 204 may occur in first in frequency, followed by time (e.g., filling columns-by-columns in the time-frequency grid of the TTI 210) or first in time, followed by frequency (e.g., filling row-by-rows in the time-frequency grid of the TTI 210). When applying the first-in-time mapping, the transmitter or the encoder may require knowledge of the location and/or the density of the reference signal 242 in-advance. Similarly, puncturing or rate-matching can be applied to insert the URLLC data 232 within the transmission of the eMBB data 224.

In some embodiments, when a BS transmits a UL URLLC grant to a UE before the completion of a prior ongoing UL eMBB transmission, the UE may or may not receive the URLLC grant. As such, the BS may be required to perform multiple hypotheses during the decoding of the eMBB transmission, for example, assuming the presence of URLLC data (e.g., the URLLC data 232) and the presence of a subsequent reference signal (e.g., the reference signal 242) in one hypothesis and assuming the absence of the URLLC data and the subsequent reference signal in another hypothesis. Alternatively, the BS may assume that the URLLC grant is always received by the UE, as the probability of missing the grant may be sufficiently low.

The insertion of the reference signal 242, for example, the time location, the number of frequency tones, and/or the density of the reference signal 242, may depend on several factors. In an embodiment, the insertion of the reference signal 242 may depend on the location of the reference signal 222. For example, when the transmission of the reference signal 222 occurs after the portion 230, the insertion of the reference signal 242 may not be required. In some instances, the reference signal 222 may be repeated at intervals within the TTI 210 to support high-mobility. Alternatively, when the reference signal 222 is distributed over the TTI 210 including the portion 240, the insertion of the reference signal 242 may not be required. Conversely, when the reference signal 222 is transmitted prior to the portion 230 or during the portion 230, the insertion of the reference signal 242 is required.

In an embodiment, the insertion of the reference signal 242 may be dependent on the modulation coding scheme (MCS), the waveform type, and/or transmission rank of the eMBB data 224. For example, when the eMBB data 224 is transmitted using a low-order MCS, the performance degradation due to the phase coherence loss may be minimal or insignificant, the insertion of the reference signal 242 may not be required. Conversely, when the eMBB data 224 is transmitted using a high-order MCS, the performance degradation due to the phase coherence loss may be substantial, the insertion of the reference signal 242 may be required.

In an embodiment, the insertion of the reference signal 242 and/or the time-frequency density of the reference signal 242 may be dependent on the UE or the receiver capability. For example, when a UE can simultaneously receive and/or transmit in multiple bandwidths and/or component carriers, the insertion of the reference signal 242 may not be required. In some instance, the insertion of the reference signal 242 may depend on the timing required by the UE or the receiver to communicate an acknowledgement (e.g., for an hybrid-automatic repeat request (HARQ) transmission).

In an embodiment, the insertion of the reference signal 242 may be dependent on the transmission power level used for transmitting the URLLC data 232 in comparison to the transmission power level used for transmitting the eMBB data 224. A change in transmission power levels can cause a phase change in the receiver signal. For example, when the difference in the transmission power levels for the URLLC data 232 and the eMBB data 224 is greater than a particular threshold, the insertion of the reference signal 242 may be required. Conversely, when the difference in the transmission power levels for the URLLC data 232 and the eMBB data 224 is below a particular threshold, the insertion of the reference signal 242 may not be required.

In some embodiments, the reference signal 242 may include a DMRS, a CSI-RS, and/or a SRS. In an embodiment, the reference signal 222 may include a DMRS and another reference signal (e.g., a CSI-RS) may be initially scheduled to be transmitted in the portion 230. In such an embodiment, the reference signal 242 may include both a DMRS and a CSI-RS. For example, the DMRS signal may be transmitted in a symbol 212 after transmitting the CSI-RS or in a symbol 212 before transmitting the CSI-RS.

Figure 6:
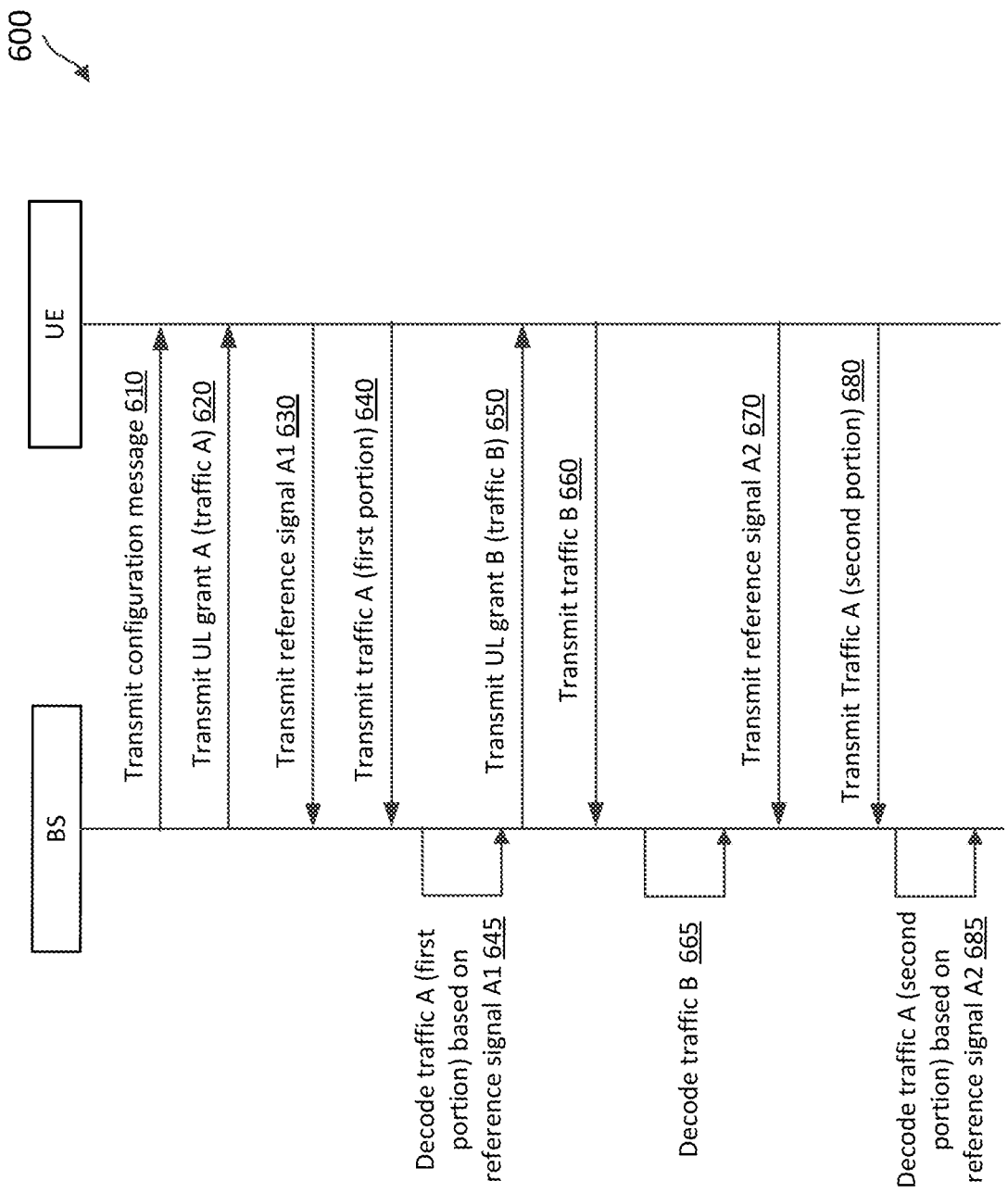
FIG. 6 illustrates a signaling diagram of a communication method including eMBB and URLLC communications according to embodiments of the present disclosure.

FIG. 6 illustrates a signaling diagram of a communication method 600 including eMBB and URLLC communications according to embodiments of the present disclosure. The method 600 may be implemented between a BS such as the BS 105 and 400 and a UE such as the UEs 115 and 300. The method 600 may use similar mechanisms as described in the configuration 500 with respect to FIG. 5. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates one BS and one UE for purposes of simplicity of discussion, though it will be recognized that embodiments of the present disclosure may scale to many more UEs and/or BSs.

At step 610, the BS transmits a configuration message to the UE. The configuration message may indicate various configurations for determining whether to insert additional reference signals (e.g., the reference signal 242) after the insertion or interruption by high-priority traffic (e.g., the URLLC data 232). The configuration message may indicate various factors, such as transmission power level differences between high-priority and low-priority traffic, the location and/or the density of the reference signal (e.g., the reference signal 222) in the low-priority traffic as described above in the configuration 500 with respect to FIG. 5. The BS may transmit the configuration message in a MIB, a minimum SIB (MSIB), a other SIB (OSIB), a radio resource configuration (RRC) message, a media access control-element (MAC-CE), and/or a downlink control information (DCI). Accordingly, the UE may determine whether to communicate an additional reference signal after a communication of low-priority data is interrupted by a communication of high-priority data based on the configuration.

At step 620, the BS transmits a UL grant A for traffic A, which may correspond to eMBB traffic. At step 630, the UE transmits a reference signal A1 (e.g., the reference signal 222) in a time period (e.g., the TTI 210) based on the UL grant A. At step 640, the UE transmits a first portion of traffic A (e.g., eMBB data 224) based on the UL grant A. At step 645, the BS decodes the first portion of the traffic A based on the reference signal A.

At step 650, the BS transmits a UL grant B for traffic B, for example, having a higher priority than traffic A, where traffic B may correspond to URLLC traffic. At step 660, the UE transmits traffic B based on the UL grant B. At step 665, the BS decodes the traffic B.

At step 670, after transmitting the traffic B, the UE transmits an additional reference signal A2 (e.g., the reference signal 242). At step 680, the UE transmits a second portion of the traffic A. At step 685, the BS decodes the remaining traffic A based on the additional reference signal B. While the method 600 is described in the context of DL communications, similar mechanisms may be applied for UL communications.

Figure 7:
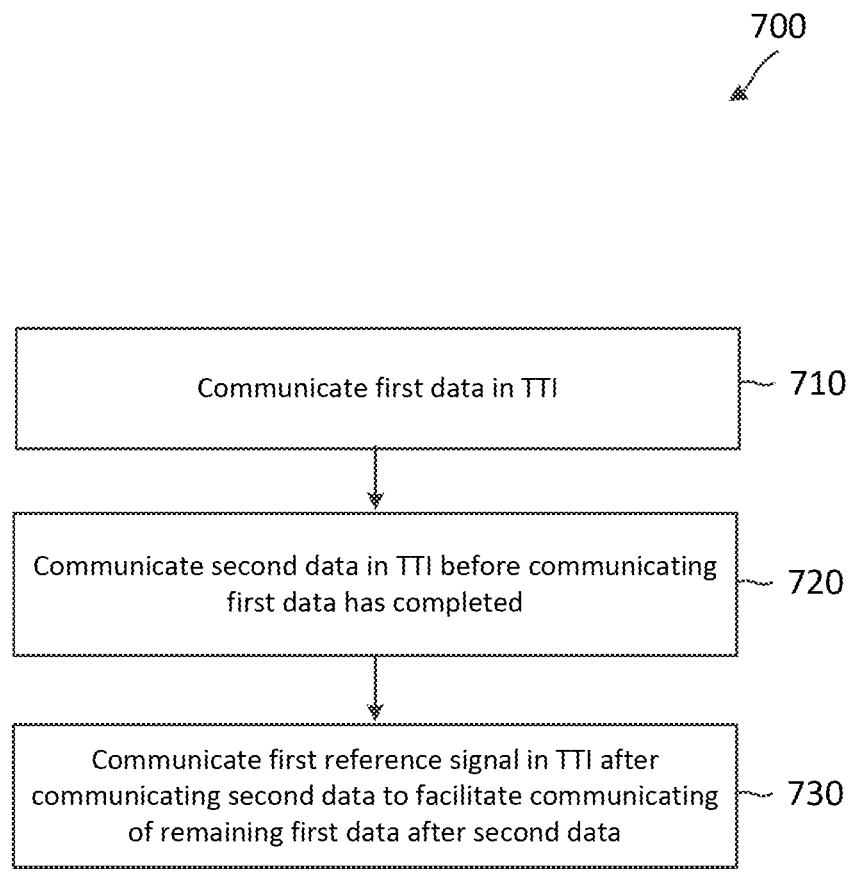
FIG. 7 is a flow diagram of a communication method according to embodiments of the present disclosure.

FIG. 7 is a flow diagram of a communication method 700 according to embodiments of the present disclosure. Steps of the method 700 can be executed by a computing device (e.g., a processor, processing circuit, and/or other suitable component) of a wireless communication device, such as the BSs 105 and 400 and the UEs 115 and 300. The method 700 may employ similar mechanisms as in the scenario 200 and the method as described with respect to FIGS. 2 and 6, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes communicating, by a first wireless communication device with a second wireless communication device, first data (e.g., the eMBB data 224) in a TTI (e.g., the TTI (210).

At step 720, the method 700 includes communicating, by the first wireless communication device with the second wireless communication device, second data (e.g., the URLLC data 232) in the TTI (e.g., in the portion 230) before the communicating the first data has completed. The second data may have a higher communication priority than the first data.

At step 730, the method 700 includes communicating, by the first wireless communication device with the second wireless communication device, a first reference signal (e.g., the additional reference signal 242) in the TTI (e.g., in the portion 240) after communicating the second data to facilitate communicating of remaining first data after second data.

In an embodiment, the first wireless communication device may correspond to a BS (e.g., the BSs 105 and 400) and the second wireless communication device may correspond to a UE (e.g., the UEs 115 and 300). In such an embodiment, the first wireless communication device may communicate the configuration by transmitting the configuration to the second wireless communication device.

In another embodiment, the first wireless communication device may correspond to a UE (e.g., the UEs 115 and 300) and the second wireless communication device may correspond to a BS (e.g., the BSs 105 and 400). In such an embodiment, the first wireless communication device may communicate the configuration by receiving the configuration from the second wireless communication device.

In some embodiments, the method 700 may further include communicating, by the first wireless communication device with the second wireless communication device, a second reference signal (e.g., the reference signal 222) during the TTI to facilitate the communicating of the first data. In an embodiment, the communicating the first reference signal is based on at least one of a location in time, a density, a time distribution, or a frequency distribution of the second reference signal in the TTI.

In some embodiments, the communicating the first reference signal is based on at least one of a transmission power level used for communicating the first data or a transmission power level used for communicating the second data. In some embodiments, the communicating the first reference signal is based on at least one of a MCS, a transmission rank, or a waveform types used for communicating the first data. In some embodiments, the communicating the first reference signal is based on puncturing of the first data. In some embodiments, the communicating the first data further includes applying rate-matching based on the communicating the first reference signal.

In some embodiments, the communicating the first data, the second data, and the first reference signal may include transmitting, from the first wireless communication device to the second wireless communication device, the first data, the second data, and the first reference signal, respectively. In some embodiments, the communicating the first data, the second data, and the first reference signal may include receiving, by the first wireless communication device from the second wireless communication device, the first data, the second data, and the first reference signal, respectively. The communicating the first data, the second data, and the first reference signal may be in a UL direction or a DL direction.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, first data in a transmission time interval (TTI); communicating, by the first wireless communication device with the second wireless communication device, second data in the TTI before the communicating the first data has completed, the second data including a higher priority than the first data; and communicating, by the first wireless communication device with the second wireless communication device, a first reference signal in the TTI after communicating the second data to facilitate communicating of remaining first data after the second data.

In some embodiments, the method further comprises communicating, by the first wireless communication device with the second wireless communication device, a second reference signal during the TTI to facilitate the communicating of the first data. In some embodiments, wherein the communicating the first reference signal is based on at least one of a location in time, a density, a time distribution, or a frequency distribution of the second reference signal in the TTI. In some embodiments, wherein the communicating the first reference signal is based on at least one of a transmission power level used for communicating the first data or a transmission power level used for communicating the second data. In some embodiments, wherein the communicating the first reference signal is based on at least one of a modulation coding scheme (MCS), a transmission rank, or a waveform type used for communicating the first data. In some embodiments, wherein the communicating the first reference signal is based on puncturing of the first data. In some embodiments, wherein the communicating the first data further includes applying rate-matching based on the communicating the first reference signal. In some embodiments, wherein the communicating the first data includes transmitting, by the first wireless communication device to the second wireless communication device, the first data, wherein the communicating the second data includes transmitting, by the first wireless communication device to the second wireless communication device, the second data, and wherein the communicating the first reference signal includes transmitting, by the first wireless communication device to the second wireless communication device, the first reference signal. In some embodiments, wherein the communicating the second data includes receiving, by the first wireless communication device from the second wireless communication device, the second data, wherein the communicating the first reference signal includes receiving, by the first wireless communication device from the second wireless communication device, the first reference signal, and wherein the communicating the first data includes receiving, by the first wireless communication device from the second wireless communication device, at least a portion of the first data based on the first reference signal. In some embodiments, wherein the communicating the first reference signal is based on at least a capability of the second wireless communication device. In some embodiments, wherein the first reference signal includes at least one of a demodulation reference signal (DMRS), a channel state information-reference signal (CSI-RS), a sounding reference signal (SRS), or a phase tracking reference signal (PTRS). In some embodiments, wherein the first data is associated with an enhanced mobile broadband (eMBB) traffic, and wherein the second data is associated with ultra-reliable low-latency (URLLC) traffic.

Further embodiments of the present disclosure include an apparatus comprising a transceiver configured to communicate, with a second wireless communication device, first data in a transmission time interval (TTI); communicate, with the second wireless communication device, second data in the TTI before the communicating the first data has completed, the second data including a higher priority than the first data; and communicate, with the second wireless communication device, a first reference signal in the TTI after communicating the second data to facilitate communicating of remaining first data after the second data.

In some embodiments, wherein the transceiver is further configured to communicate, with the second wireless communication device, a second reference signal during the TTI to facilitate the communicating of the first data. In some embodiments, wherein the transceiver is further configured to communicate the first reference signal based on at least one of a location in time, a density, a time distribution, or a frequency distribution of the second reference signal in the TTI. In some embodiments, wherein the transceiver is further configured to communicate the first reference signal based on at least one of a transmission power level used for communicating the first data or a transmission power level used for communicating the second data. In some embodiments, wherein the transceiver is further configured to communicate the first reference signal is based on at least one of a modulation coding scheme (MCS), a transmission rank, or a waveform type used for communicating the first data. In some embodiments, wherein the transceiver is further configured to communicate the first reference signal based on puncturing of the first data. In some embodiments, wherein the transceiver is further configured to communicate the first data further by applying rate-matching based on the first reference signal. In some embodiments, wherein the transceiver is further configured to communicate the first data by transmitting, to the second wireless communication device, the first data; communicate the second data by transmitting, device to the second wireless communication device, the second data; and communicate the first reference signal by transmitting, to the second wireless communication device, the first reference signal. In some embodiments, wherein the transceiver is further configured to communicate the second data by receiving, from the second wireless communication device, the second data; communicate the first reference signal by receiving, from the second wireless communication device, the first reference signal; and communicate the first data by receiving, from the second wireless communication device, at least a portion of the first data based on the first reference signal. In some embodiments, wherein the transceiver is further configured to communicate the first reference signal based on at least a capability of the second wireless communication device. In some embodiments, wherein the first reference signal includes at least one of a demodulation reference signal (DMRS), a channel state information-reference signal (CSI-RS), a sounding reference signal (SRS), or a phase tracking reference signal (PTRS). In some embodiments, wherein the first data is associated with an enhanced mobile broadband (eMBB) traffic, and wherein the second data is associated with ultra-reliable low-latency (URLLC) traffic.

Further embodiments of the present disclosure include an apparatus comprising means for communicating, with a wireless communication device, a configuration for determining whether to communicate a first reference signal after a communication of first data is interrupted by a communication of second data having a higher priority than the first data; means for communicating, with the wireless communication device, the first data in a transmission time interval (TTI); means for communicating, with the wireless communication device, the second data in the TTI before the communicating the first data has completed; and means for communicating, with the wireless communication device based on the configuration, a first reference signal in the TTI after communicating the second data to facilitate communicating of remaining first data.

In some embodiments, the apparatus further comprises means for communicating, with the wireless communication device, a second reference signal during the TTI to facilitate the communicating of the first data. In some embodiments, wherein the means for communicating the first reference signal is further configured to communicate the first reference signal in response to a determination of at least one of a location in time, a density, a time distribution, or a frequency distribution of the second reference signal in the TTI based on the configuration. In some embodiments, wherein the means for communicating the first reference signal is further configured to communicate the first reference signal in response to a determination of at least one of a transmission power level used for communicating the first data or a transmission power level used for communicating the second data based on the configuration. In some embodiments, wherein the means for communicating the first reference signal is further configured to communicate the first reference signal in response to a determination of at least one of a modulation coding scheme (MCS), a transmission rank, or a waveform type used for communicating the first data based on the configuration. In some embodiments, wherein the means for communicating the first reference signal is further configured to communicate the first reference signal based on puncturing of the first data. In some embodiments, wherein the means for communicating the first data is further configured to communicate the first data further by applying rate-matching based on the first reference signal. In some embodiments, wherein the means for communicating the first data is further configured to communicate the first data by transmitting, to the wireless communication device, the first data, wherein the means for communicating the second data is further configured to communicate the second data by transmitting, to the wireless communication device, the second data, wherein the means for communicating the first reference signal is further configured to communicate the first reference signal by transmitting, to the wireless communication device, the first reference signal. In some embodiments, wherein the means for communicating the second data is further configured to communicate the second data by receiving, from the wireless communication device, the second data, wherein the means for communicating the first reference signal is further configured to communicate the first reference signal by receiving, from the wireless communication device, the first reference signal, and wherein the means for communicating the first data is further configured to communicate the first data by receiving, from the wireless communication device, at least a portion of the first data based on the first reference signal. In some embodiments, wherein the means for communicating the first reference signal is further configured to communicate the first reference signal based on at least one of a capability of apparatus or a capability of the wireless communication device. In some embodiments, wherein the first reference signal includes at least one of a demodulation reference signal (DMRS), a channel state information-reference signal (CSI-RS), a sounding reference signal (SRS), or a phase tracking reference signal (PTRS). In some embodiments, wherein the first data is associated with an enhanced mobile broadband (eMBB) traffic, and wherein the second data is associated with ultra-reliable low-latency (URLLC) traffic.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication via a radio channel, the method comprising:
   communicating a configuration for determining whether to communicate an additional reference signal after a communication of first data is interrupted by a communication of second data having a higher priority than the first data, the additional reference signal being in addition to an initial reference signal to enable a receiving device to decode the first data and configured for use in estimating the radio channel after the communication of the second data interrupts the communication of the first data;
   communicating the initial reference signal in a first portion of a transmission time interval (TTI);
   communicating the first data in the first portion of the TTI;
   communicating the second data in the TTI before the communicating the first data has completed leaving remaining first data uncommunicated;
   communicating, based on the configuration, the additional reference signal in a second portion of the TTI after the communicating the second data in response to a determination to communicate the additional reference signal; and
   communicating the remaining first data in the second portion of the TTI based on an estimation of the radio channel performed using the communicated additional reference signal.

2. The method of claim 1, wherein the determination to communicate the additional reference signal comprises a determination of a loss of phase coherence.

3. The method of claim 1, wherein the determination to communicate the additional reference signal comprises a determination of a loss of phase coherence by determining at least one of a location in time, a density, a time distribution, or a frequency distribution of the initial reference signal in the TTI based on the configuration, the determination indicating the loss of phase coherence in the radio channel.

4. The method of claim 1, wherein the determination to communicate the additional reference signal comprises a determination of a loss of phase coherence by determining a change between a transmission power level used for communicating the first data and a transmission power level used for communicating the second data based on the configuration, the determination indicating the loss of phase coherence in the radio channel.

5. The method of claim 1, wherein the determination to communicate the additional reference signal comprises a determination of a loss of phase coherence by determining at least one of a modulation coding scheme (MCS), a transmission rank, or a waveform type used for communicating the first data based on the configuration, the determination indicating the loss of phase coherence in the radio channel.

6. The method of claim 1, wherein the communicating the additional reference signal is based on puncturing of the first data.

7. The method of claim 1, wherein the communicating the first data further includes applying rate-matching based on the communicating the additional reference signal.

8. The method of claim 1, wherein the communicating the first data includes transmitting the first data, wherein the communicating the second data includes transmitting the second data, and wherein the communicating the additional reference signal includes transmitting the additional reference signal.

9. The method of claim 1, wherein the communicating the second data includes receiving the second data, wherein the communicating the additional reference signal includes receiving the additional reference signal, and wherein the communicating the first data includes receiving at least a portion of the first data based on the additional reference signal.

10. The method of claim 1, wherein the communicating the configuration includes transmitting, by a base station (BS) to a user equipment (UE), the configuration, and wherein the communicating the additional reference signal is based on at least one of a capability of the BS or a capability of the UE.

11. The method of claim 1, wherein the communicating the configuration includes receiving, by a user equipment (UE) from a base station (BS), the configuration, and wherein the communicating the additional reference signal is based on at least one of a capability of the BS or a capability of the UE.

12. The method of claim 1, wherein the first data is associated with an enhanced mobile broadband (eMBB)

traffic, and wherein the second data is associated with ultra-reliable low-latency (URLLC) traffic.

13. An apparatus comprising:
a transceiver configured to:
communicate a configuration for determining whether to communicate an additional reference signal after a communication of first data via a radio channel is interrupted by a communication, via the radio channel, of second data having a higher priority than the first data, the additional reference signal being in addition to an initial reference signal to enable a receiving device to decode the first data and configured for use in estimating the radio channel after the communication of the second data interrupts the communication of the first data;
communicate the initial reference signal in a first portion of a transmission time interval (TTI);
communicate the first data in the first portion of the TTI;
communicate the second data in the TTI before the communicating the first data has completed leaving remaining first data uncommunicated;
communicate, based on the configuration, the additional reference signal in a second portion of the TTI after the communicating the second data in response to a determination to communicate the additional reference signal; and
communicate the remaining first data in the second portion of the TTI based on an estimation of the radio channel performed using the communicated additional reference signal.

14. The apparatus of claim 13, wherein the determination to communicate the additional reference signal comprises a determination of a loss of phase coherence.

15. The apparatus of claim 13, wherein the determination to communicate the additional reference signal comprises a determination of a loss of phase coherence by determining at least one of a location in time, a density, a time distribution, or a frequency distribution of the initial reference signal in the TTI based on the configuration, the determination indicating the loss of phase coherence in the radio channel.

16. The apparatus of claim 13, wherein the determination to communicate the additional reference signal comprises a determination of a loss of phase coherence by determining a change between a transmission power level used for communicating the first data and a transmission power level used for communicating the second data based on the configuration, the determination indicating the loss of phase coherence in the radio channel.

17. The apparatus of claim 13, wherein the determination to communicate the additional reference signal comprises a determination of a loss of phase coherence by determining at least one of a modulation coding scheme (MCS), a transmission rank, or a waveform type used for communicating the first data based on the configuration, the determination indicating the loss of phase coherence in the radio channel.

18. The apparatus of claim 13, wherein the transceiver is further configured to communicate the additional reference signal based on puncturing of the first data.

19. The apparatus of claim 13, wherein the transceiver is further configured to communicate the first data further by applying rate-matching based on the additional reference signal.

20. The apparatus of claim 13, wherein the transceiver is further configured to:
communicate the first data by transmitting the first data;
communicate the second data by transmitting the second data; and
communicate the additional reference signal by transmitting the additional reference signal.

21. The apparatus of claim 13, wherein the transceiver is further configured to:
communicate the second data by receiving the second data;
communicate the additional reference signal by receiving the additional reference signal; and
communicate the first data by receiving at least a portion of the first data based on the additional reference signal.

22. The apparatus of claim 13, wherein the apparatus is a base station (BS), wherein the transceiver is further configured to:
communicate the configuration by transmitting, to a user equipment (UE), the configuration; and
communicate the additional reference signal based on at least one of a capability of the BS or a capability of the UE.

23. The apparatus of claim 13, wherein the apparatus is a user equipment (UE), wherein the transceiver is further configured to:
communicate the configuration by receiving, from a base station (BS), the configuration; and
communicate the additional reference signal based on at least one of a capability of the BS or a capability of the UE.

24. A non-transitory computer-readable medium having program code for wireless communication recorded thereon, the program code comprising instructions executable by a processor to:
communicate a configuration for determining whether to communicate an additional reference signal after a communication of first data via a radio channel is interrupted by a communication, via the radio channel, of second data having a higher priority than the first data, the additional reference signal being in addition to an initial reference signal to enable a receiving device to decode the first data and configured for use in estimating the radio channel after the communication of the second data interrupts the communication of the first data;
communicate the initial reference signal in a first portion of a transmission time interval (TTI);
communicate the first data in the first portion of the TTI;
communicate the second data in the TTI before the communicating the first data has completed leaving remaining first data uncommunicated;
communicate, based on the configuration, the additional reference signal in a second portion of the TTI after the communicating the second data in response to a determination the additional reference signal; and
communicate the remaining first data in the second portion of the TTI based on an estimation of the radio channel performed using the communicated additional reference signal.

25. The non-transitory computer-readable medium of claim 24, wherein the determination to communicate the additional reference signal comprises a determination of a loss of phase coherence.

26. The non-transitory computer-readable medium of claim 24, wherein the determination to communicate the additional reference signal comprises a determination of a loss of phase coherence by determining at least one of a location in time, a density, a time distribution, or a frequency distribution of the initial reference signal in the TTI based on the configuration.

27. The non-transitory computer-readable medium of claim 24, wherein the determination to communicate the additional reference signal comprises a determination of a loss of phase coherence by determining a change between a transmission power level used for communicating the first data and a transmission power level used for communicating the second data based on the configuration.

28. The non-transitory computer-readable medium of claim 24, wherein the determination to communicate the additional reference signal comprises a determination of a loss of phase coherence by determining at least one of a modulation coding scheme (MCS), a transmission rank, or a waveform type used for communicating the first data based on the configuration.

29. The non-transitory computer-readable medium of claim 24, wherein the code for causing the processor to communicate the additional reference signal is further configured to communicate the additional reference signal based on puncturing of the first data.

30. The non-transitory computer-readable medium of claim 24, wherein the code for causing the processor to communicate the first data is further configured to communicate the first data by applying rate-matching based on the communicating the additional reference signal.

* * * * *